United States Patent [19]

Prado

[11] 4,149,525
[45] Apr. 17, 1979

[54] SOLAR COLLECTOR

[76] Inventor: David A. Prado, 2002 W. 19th St., Chicago, Ill. 60608

[21] Appl. No.: 842,071

[22] Filed: Oct. 14, 1977

[51] Int. Cl.² .................................................. F24J 3/02
[52] U.S. Cl. .................................................. 126/271
[58] Field of Search ................ 126/270, 271; 237/1 A

[56] References Cited

U.S. PATENT DOCUMENTS

| 3,299,881 | 1/1967 | Koch | 126/271 |
| 4,055,163 | 10/1977 | Costello et al. | 237/1 |
| 4,062,351 | 12/1977 | Hastwell | 126/271 |
| 4,069,809 | 1/1978 | Strand | 126/270 |
| 4,076,015 | 2/1978 | Mattson | 126/271 |
| 4,084,573 | 4/1978 | Shubert | 126/270 |
| 4,086,911 | 5/1978 | Futch | 237/1 |

Primary Examiner—Kenneth W. Sprague
Attorney, Agent, or Firm—Keil & Witherspoon

[57] ABSTRACT

A solar collector having the shape of a step pyramid which is enclosed within a transparent dome and a bottom insulating layer. A continuous coil of tubing conforming to the same shape as the step pyramid is in contact with each successive step. Because of this shape, the collector receives solar radiation during all daylight hours without the use of mirrors or tracking devices.

14 Claims, 4 Drawing Figures

SOLAR COLLECTOR

BACKGROUND OF THE INVENTION

1. Field of the Invention

This invention relates to apparatus for utilizing solar radiation and in particular to an apparatus for absorbing solar radiation for use in heating fluids to elevated temperatures.

2. Description of the Prior Art

It is known to collect solar radiation using a wide variety of designs. A solar water heater using a conical-shaped coil of metal tubing enclosed within a double walled, dome-shaped cover is disclosed in U.S. Pat. No. 2,213,894. The coil is self-supporting and does not contain a backing member. U.S. Pat. No. 2,402,326 discloses a solar heater which uses a frusto-conical-shaped support containing a spiral grooveway on its upper surface. Disposed in the grooves is a metal tube. Sunlight which passes through the protective glass cover is absorbed, heating the mass of the frusto-conical support and enclosed tube. In U.S. Pat. No. 3,853,114 a solar heater is disclosed which uses a double walled transparent box. The cavity of the inner box is filled with a particulate, heat absorbing material. Disposed within the inner cavity and surrounded by the particulate material is a helical or sinuous array of tubing containing the fluid to be heated. As the particulate matter absorbs solar energy, the entire mass of the inner cavity becomes heated.

The solar collector which has found the widest application is the flat-plate collector. Basically, this type of collector is simply an absorbing surface covered by a transparent cover to trap heat within the collector and reduce convective radiation loss. The absorbed radiation is removed from the absorbing surface by means of a working fluid which is generally contained in metal tubing. This design has the advantage of low fabrication, installation and maintenance costs. These collectors are usually mounted in a fixed position with a south to southwest orientation and are therefore useful only during the middle portion of the day. In order to increase the efficiency of flat-plate collectors, various sun-tracking and panel reflectors have been proposed. These embodiments, however, add considerably to the cost and maintenance of the collector. Moreover, the typical flat-plate collector panel is relatively large (4 ft by 8 ft) and involves considerable weight.

BRIEF DESCRIPTION OF THE INVENTION

The present invention relates to a solar collector of improved design which comprises an upper cover of material which is transparent to solar radiation, a lower cover at least in part of heat insulating material said upper and lower covers forming an enclosure, a sheet of solar energy absorbing material within the enclosure, the sheet being in the shape of a step pyramid having a plurality of steps wherein the upper cover, lower cover and sheet of energy absorbing material forms a sealed inner cavity, and heat transfer fluid conducting means generally conforming to the shape of the step pyramid and contacting each successive thereof.

An important feature of the invention is the shape of the collector which is preferably that of a right square step pyramid. The heat transfer fluid conducting means is preferably a continuous double reverse flow coil of tubing having the same shape as the pyramid and encircling each successive level of the pyramid. The tubing is in continuous constant contact with each step of the pyramid. The collector is covered with a dome-shaped material which is transparent to solar radiation and is also covered at its base with a heat insulating material.

A heat transfer fluid is circulated through the continuous double reverse flow coil from a fluid source. As the fluid ascends each step of the pyramid, heat is collected from the metallic absorbing surface. The coil is placed such that it receives both direct and diffuse solar radiation and also reflected radiation from the metallic surface of the step pyramid. The fluid collects heat energy as it both ascends and then reverses the direction of flow and descends through each respective level of the pyramid.

By suitable orientation of the collector, it is possible for all the sides to function as collectors for solar radiation during the period when such energy is available. Because of the shape of the collector, a large collecting surface is possible even though the area occupied by the base of the collector is less than that occupied by conventional collectors such as flat plate collector panels. Moreover, the reduction in size results in a considerable savings with respect to the weight of the collector, i.e. the present collector less carrier fluid weighs less than about 50 lbs.

It is therefore an object of the invention to provide s collector for the efficient conversion of solar radiation.

Another object is to provide a collector which can collect solar radiation during all periods when radiation is available in a simple manner and at low cost.

Another object is to provide a solar collector which has a large collecting area while minimizing the surface area occupied by the base of the collector.

Yet another object is to provide a solar collector which has a large collecting area while minimizing the total weight of the collector.

A further object is to provide a collector which is easily adapted to existing structures such as private residences which have minimal area available for solar collectors.

BRIEF DESCRIPTION OF THE DRAWINGS

The foregoing and other objects are achieved in accordance with the following detailed description, advantageous embodiments of which will be described with reference to the accompanying drawings wherein.

DESCRIPTION OF THE PREFERRED EMBODIMENT

Figure 1:
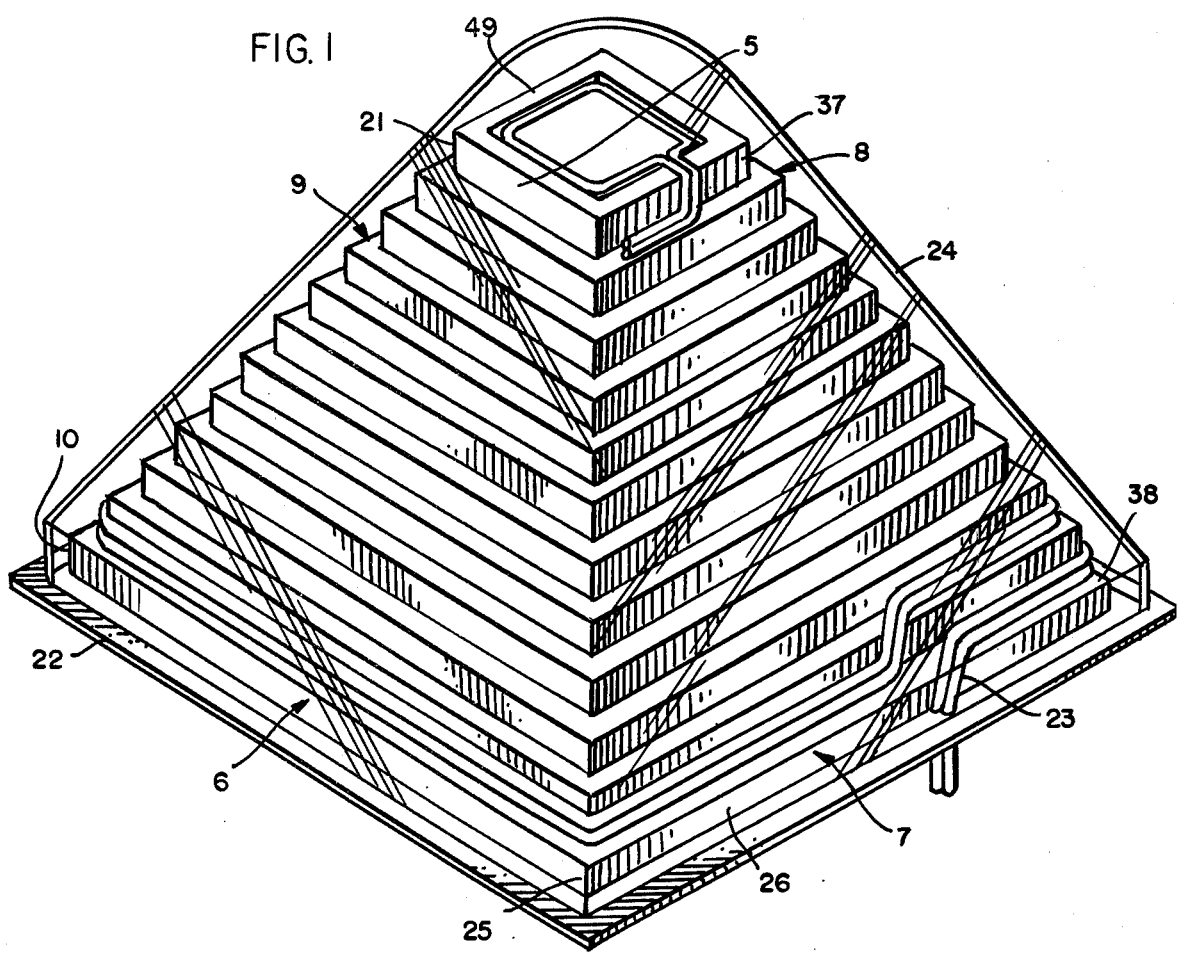
FIG. 1 is a perspective view of the solar collector according to the invention.

Referring to the drawings, there is shown in FIG. 1 a solar collector having a sheet of energy absorbing material in the shape of a step pyramid. The sheet of energy absorbing material comprises a plurality of steps 10-21 having vertical faces 26-37 and horizontal faces 38-49. The collector rests on a base plate 22. The interior of the collector may be hollow or may preferably contain reinforcing strips and heat insulating materials. A double continuous reverse flow coil of tubing 23 surrounds and contacts each of the steps 10-21. The collector is covered by a dome-shaped cover 24. The precise dimensions and number of steps in the collector are not critical to the operation of the invention. Each individual step of the external shell may be rectangular or preferably square shaped. The first step 10 may typically be a 4 ft. square and the entire shape that of a 12-step square pyramid in which each successive step is about 3 inches high and 3 inches less in width than the previous step thus forming a pyramid which is about 3 feet high. The shape is thus preferably in the form of a truncated right square step pyramid.

The cover 24 can be of any material which is transparent to solar radiation, and is preferably made of glass or clear plastics material such as Plexiglass (registered trademark for methyl methacrylate polymer manufactured by Rohm & Haas Co.).

The sheet of energy absorbing material can be made of relatively thin, heat conductive metal such as copper or aluminum. The preferred metal is copper. The thickness of the metal is not critical to the invention. The sheet can be copper of about 0.02 inches thickness. This provides sufficient thickness for rigidity and strength while being sufficiently thin for ease of fabrication and minimum cost.

The double reverse flow coil 23 is made of heat conducting metal, preferably copper. The diameter of the tubing is again not critical, and may be from $\frac{1}{2}$ to $\frac{3}{4}$ inches in diameter. In a 3 ft. high collector having a 4 ft. square base and 12 steps, about 340 ft. of tubing is required. The liquid used as a heat transfer medium is preferably water or water treated with corrosion and-/or antifreeze additives.

When the collector is made of copper metal, both reflection and absorption of solar radiation can occur. During daylight hours, the entire surface of the collector is heated. In one embodiment, the copper tubing 23 carrying the heat transfer liquid may be coated with a black material, e.g. black paint, to increase absorption and decrease reradiation from the tubing. In another embodiment, selected portions of either the vertical or horizontal faces of the respective steps 10-21 can be coated with a black substance. This will of course increase the absorptivity and decrease the reflectivity of the so-treated surface. It is also possible to coat the exterior surface of the energy absorbing sheet with black paint and to place the coil 23 in contact with the interior surface of the successive steps of the energy absorbing sheet, thus disposing the coil 23 within an interior cavity formed by said sheet and the lower cover.

The collector of FIG. 1 can be used in conjunction with a conventional heat storage system which includes pumps, temperature sensing devices, valves, storage tanks, photoelectric sensing devices, auxiliary energy source and a distribution system. The heat absorbed by the collector is transferred to the liquid contained in tubing 23. The rate of flow of the liquid through the tubing can be controlled by a pump, valves and thermistor or other temperature sensing device. A photoelectric cell can be employed to control the operation of the fluid circulation system.

One advantage of the collector shown in FIG. 1 over conventional flat plate collectors is that no expensive tracking devices or mirrors are required to collect radiation during all daylight hours. Moreover, due to the shape of the collector, a large collecting surface is available even though the surface area on which the collector is mounted is less than that of a flat plate collector. A typical flat collector panel is 4×8 ft., whereas a collector of the present invention is typically 4×4 ft. Furthermore, a typical 4×8 ft. flat plate collector panel weighs about 200 lbs. whereas the present collector weighs less than 50 lbs. thus resulting in a considerable weight advantage.

Figure 2:
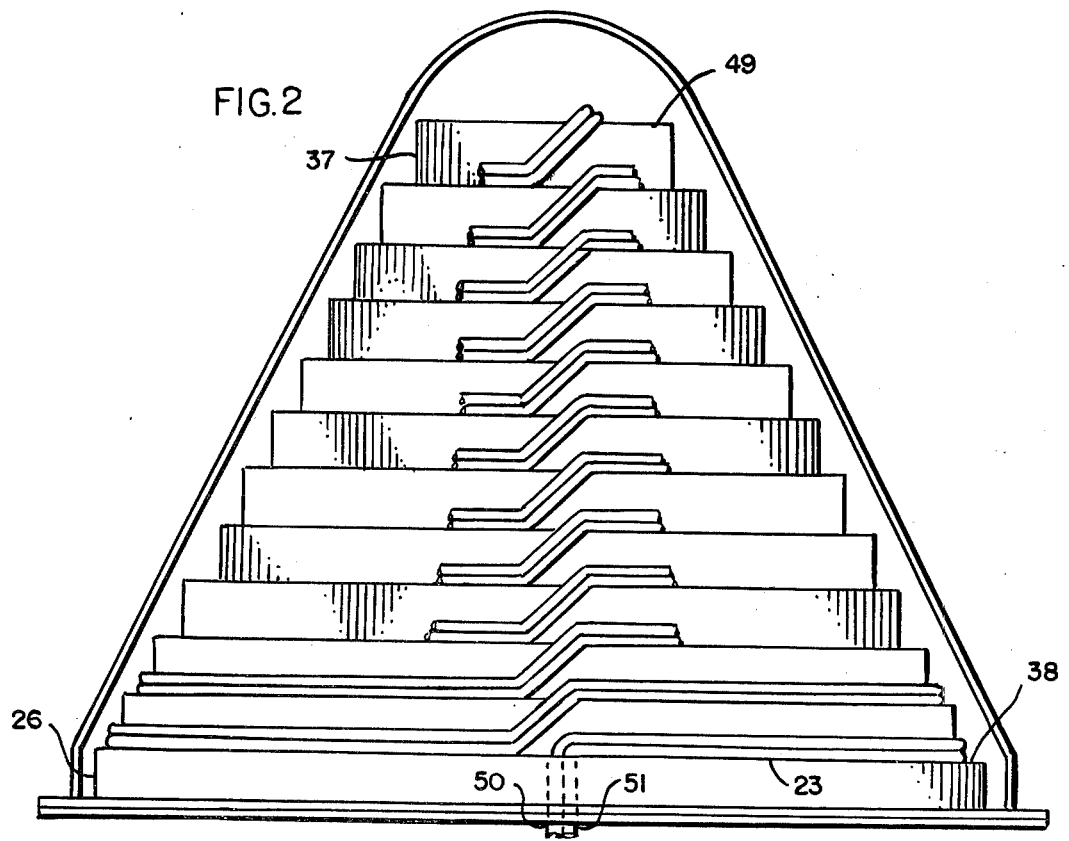
FIG. 2 is a side elevational view of the collector according to the invention showing in greater detail the steps of the collector and the coil of tubing carrying the heat transfer liquid.

In FIG. 2 there is shown a side view of the collector according to the invention. The vertical faces 26-37 of each successive step are 3 inches and the horizontal faces 38-49 are $1\frac{1}{2}$ inches. The uppermost step of the collector is a square 14 inches on a side. The 12 steps thus form a step pyramid 36 inches high. The double reverse flow coil 23 is $\frac{1}{2}$ inch copper tubing which enters and exits through sealed openings in the base material. The liquid to be heated enters through tubing 50 which is connected to coil 23, ascends and descends through each step of the collector and is then conducted via tubing 51 to a conventional heat storage means.

Figure 3:
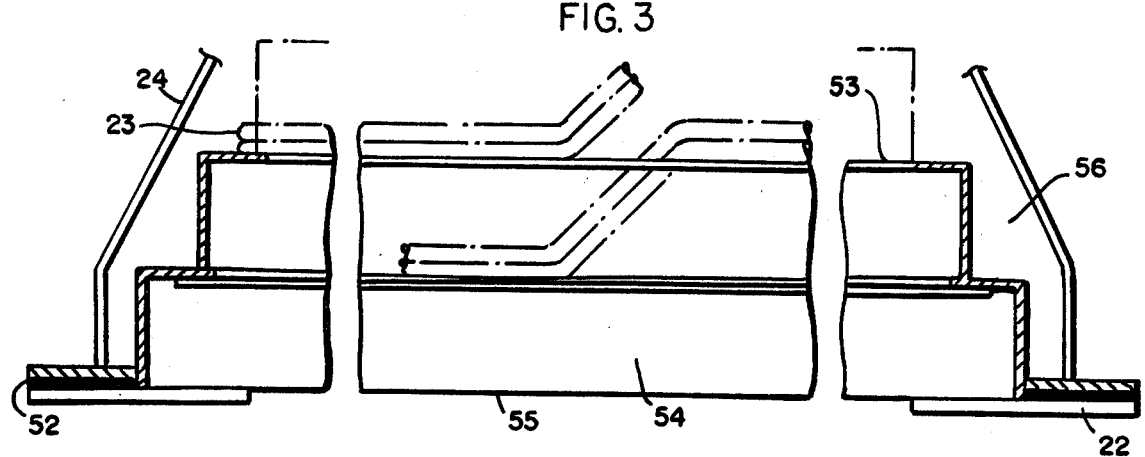
FIG. 3 is a partial cross sectional view of the collector showing the individual steps and the interior in greater detail.

FIG. 3 shows a partial cross sectional view taken along line 5 in FIG. 1. The sheet of energy absorbing material which forms the collector rests on base plate 22. The base plate can be any rigid material and is preferably a sheet of metal. A rubber seal 52 is placed between the cover 24 and the base plate 22. A thin strip of rigid reinforcing materials 53 can be placed between opposite sides of each successive step of the collector in order to provide increased structural strength. The interior 54 of the collector can be partially or fully filled with conventional heat insulating material. The bottom step 10 is covered by a lower cover 55 also made of conventional heat insulating material. The space 56 between the cover 24 and the sheet of energy absorbing material can be filled with a gas, preferably an inert gas such as nitrogen in order to minimize corrosion of any uncoated metallic surfaces of the collector.

Figure 4:
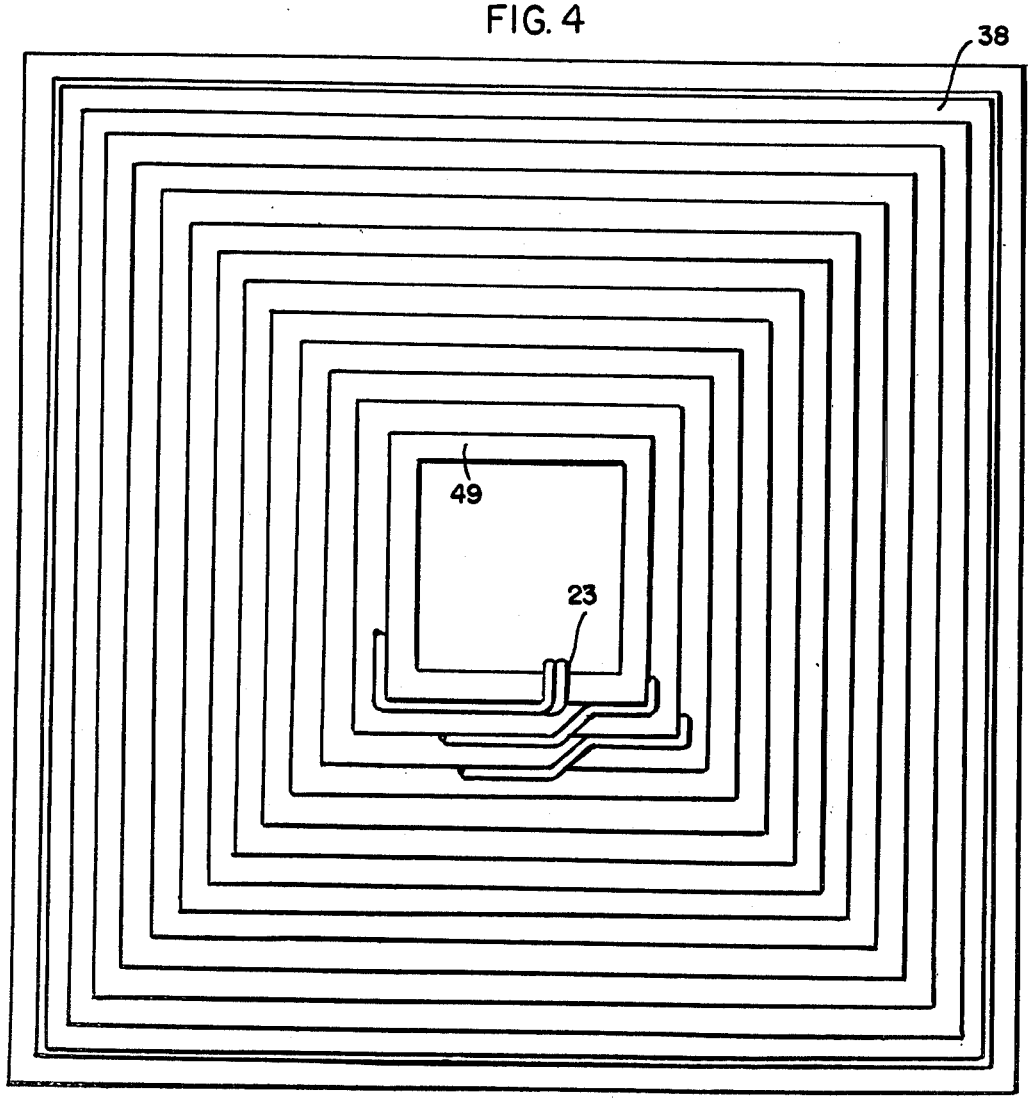
FIG. 4 is a top view of the solar collector.

FIG. 4 shows a top view of the collector with horizontal faces 38-49 and double coil 23.

The solar collector according to the invention can easily be incorporated into any shape building. In climates of relatively high average temperatures such as the southern United States, the tilt and orientation of the collector is not important. In the northern United States where relatively low average temperatures prevail, it is preferred to orient the collector such that in FIG. 1, the edge 25 formed by the intersection of sides 6 and 7 is pointed south. In this embodiment, sides 7 and 8 will collect radiation in the early morning hours. The vertical faces 26-37 of each step will be the predominant collecting surface because of the position of the sun during this period. Some radiation will be reflected onto the horizontal faces 38-49 if the vertical faces have not been coated with a black substance. As the sun rises, both the horizontal and vertical faces will receive direct sunlight. Some of the radiation will be absorbed by the copper surface of the collector and some radiation will be reflected onto another face. During the middle portion of the day, sides 6 and 7 will comprise the major collecting surfaces. In the late afternoon, sides 6 and 9 will be the major collecting surfaces. Again, because of the position of the sun, the vertical faces of these sides will receive the majority of the solar radiation.

While certain particular embodiments have been described to illustrate the invention, this should not be interpreted in any limiting sense. Various modifications can be made without departing from the scope of the invention.

I claim:

1. A solar collector for converting solar radiation to thermal energy which comprises:
   an upper cover of material which is transparent to solar radiation,
   a lower cover at least in part of heat insulating material, said upper and lower covers forming an enclosure,
   a sheet of solar energy absorbing material within the enclosure, the sheet being formed from a heat conductive metal into the shape of a right step pyramid having a plurality of steps with vertical and horizontal faces, said faces forming right angles, wherein the upper cover, lower cover, and the sheet form a sealed inner cavity, and
   heat transfer fluid conducting means generally conforming to the shape of the step pyramid and contacting each successive step thereof.

2. A solar collector as set forth in claim 1, wherein the solar energy absorbing material is copper metal.

3. A solar collector as set forth in claim 1, wherein the heat transfer fluid conducting means is a double reverse flow coil of heat conductive metal.

4. A solar collector as set forth in claim 1, wherein the heat transfer fluid conducting means is a double reverse flow copper coil.

5. A solar collector as set forth in claim 1, wherein the sheet of energy absorbing material is coated with black paint.

6. A solar collector as set forth in claim 1, wherein the heat transfer fluid conducting means is coated with black paint.

7. A solar collector as set forth in claim 1, wherein the sheet of energy absorbing material is aluminum metal coated with black paint.

8. A solar collector as set forth in claim 1, wherein the sheet of energy absorbing material has the shape of a 4 sided step pyramid.

9. A solar collector as set forth in claim 1, wherein the sheet of energy absorbing material has the shape of a square step pyramid.

10. A solar collector as set forth in claim 1, wherein the sheet of energy absorbing material has the shape of a truncated right square step pyramid.

11. A solar collector as set forth in claim 1, wherein the cavity between the upper cover and sheet of energy absorbing material is filled with an inert gas.

12. A solar collector as set forth in claim 1, wherein the cavity between the upper cover and sheet of energy absorbing material is filled with nitrogen.

13. A solar collector as set forth in claim 1, wherein the number of steps in the pyramid is 12.

14. A solar collector as set forth in claim 1, wherein the non-collecting side of the sheet of energy absorbing material is coated with a heat insulating material.

* * * * *